United States Patent
Park et al.

(10) Patent No.: US 10,981,159 B2
(45) Date of Patent: Apr. 20, 2021

(54) CATALYST PREPARATION APPARATUS AND SYSTEM

(71) Applicant: KOREA INSTITUTE OF ENERGY RESEARCH, Daejeon (KR)

(72) Inventors: Ji-chan Park, Daejeon (KR); Dong Hyun Chun, Daejeon (KR); Jung-il Yang, Daejeon (KR); Heon-do Jeong, Daejeon (KR); Heon Jung, Daejeon (KR); Ho-tae Lee, Daejeon (KR); Dong-wook Lee, Daejeon (KR); Chan-woo Lee, Daejeon (KR); Shin Wook Kang, Bonghwa-gun (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 88 days.

(21) Appl. No.: 16/394,930

(22) Filed: Apr. 25, 2019

(65) Prior Publication Data
US 2019/0247841 A1    Aug. 15, 2019

Related U.S. Application Data

(63) Continuation-in-part of application No. PCT/KR2018/005561, filed on May 15, 2018.

(30) Foreign Application Priority Data

May 19, 2017 (KR) .................. 10-2017-0062120
May 14, 2018 (KR) .................. 10-2018-0054957

(51) Int. Cl.
*B01J 37/02* (2006.01)
*B01J 33/00* (2006.01)
(Continued)

(52) U.S. Cl.
CPC .......... *B01J 37/0201* (2013.01); *B01J 33/00* (2013.01); *B01J 37/0236* (2013.01); *B01J 37/04* (2013.01);
(Continued)

(58) Field of Classification Search
None
See application file for complete search history.

(56) References Cited

U.S. PATENT DOCUMENTS

2006/0099483 A1 * 5/2006 Min ................... B01J 23/42
                                                  429/483
2007/0041893 A1 * 2/2007 Holladay ............. C01B 3/326
                                                  423/648.1
(Continued)

FOREIGN PATENT DOCUMENTS

JP    2000-202306 A    7/2000
KR    10-2009-0072554 A    7/2009
(Continued)

*Primary Examiner* — Jethro M. Pence
(74) *Attorney, Agent, or Firm* — Birch, Stewart, Kolasch & Birch, LLP

(57) ABSTRACT

The present invention comprises: a separable material injection part for injecting a material therein; a mixing part for mixing the material injected in the material injection part; an aging part for aging, at a high temperature, the material mixed in the mixing part; and a firing part for supporting, on a support, the material aged in the aging part.

14 Claims, 7 Drawing Sheets

(51) Int. Cl.
*B01J 37/04* (2006.01)
*B01J 37/08* (2006.01)
*B05C 5/00* (2006.01)
*B05C 5/02* (2006.01)

(52) U.S. Cl.
CPC ............... *B01J 37/08* (2013.01); *B05C 5/001* (2013.01); *B05C 5/002* (2013.01); *B05C 5/02* (2013.01)

(56) References Cited

U.S. PATENT DOCUMENTS

| | | | | |
|---|---|---|---|---|
| 2012/0088652 | A1* | 4/2012 | Brodziak | B01J 37/0009 502/150 |
| 2012/0275975 | A1* | 11/2012 | Lee | C01B 3/02 422/641 |
| 2012/0329889 | A1* | 12/2012 | Yang | B01J 37/0248 518/712 |
| 2014/0004027 | A1* | 1/2014 | Jurng | B01J 35/1019 423/239.1 |
| 2014/0140904 | A1* | 5/2014 | Kei | B01J 23/14 422/654 |
| 2014/0194541 | A1* | 7/2014 | Nishino | B01J 35/1057 518/715 |
| 2014/0206529 | A1* | 7/2014 | Jurng | B01J 21/063 502/242 |
| 2015/0018593 | A1* | 1/2015 | Trischler | B01J 37/0018 585/661 |
| 2015/0099210 | A1* | 4/2015 | Tseng | B01J 35/0033 429/483 |
| 2017/0065965 | A1 | 3/2017 | Park et al. | |
| 2017/0149070 | A1* | 5/2017 | Kamai | H01M 4/92 |
| 2018/0154329 | A1* | 6/2018 | Park | B01J 19/10 |

FOREIGN PATENT DOCUMENTS

| | | |
|---|---|---|
| KR | 10-2013-0038059 A | 4/2013 |
| KR | 10-2013-0081916 A | 7/2013 |
| KR | 10-2013-0081921 A | 7/2013 |
| KR | 10-1483936 B1 | 1/2015 |

\* cited by examiner

CATALYST PREPARATION APPARATUS AND SYSTEM

CROSS REFERENCE TO RELATED APPLICATIONS

This application is a Continuation-in-Part of PCT International Application No. PCT/KR2018/005561, filed on May 15, 2018, which claims priority under 35 U.S.C. 119(a) to Patent Application Nos. 10-2017-0062120, filed in the Republic of Korea on May 19, 2017 and 10-2018-0054957, filed in the Republic of Korea on May 14, 2018, all of which are hereby expressly incorporated by reference into the present application.

BACKGROUND OF THE INVENTION

1. Field of the Invention

The present invention relates to an integrated catalyst preparation apparatus and system.

2. Description of the Related Art

A catalyst is a material playing a key role in a variety of industries, including petrochemicals, plastics, and pharmaceuticals, etc. Nowadays, a catalyst is widely used not only in the huge process industry but also in everyday life related matters including deodorization and sterilization for home and industry and automobile exhaust gas decomposition.

Among the various kinds of catalysts, a nano-structured catalyst is advantageous for optimizing a reaction because the active metal nanoparticles are supported on a metal oxide such as silica or alumina having a large surface area or supported on a porous carbon material (active carbon) to control the three-dimensional structure, pore size, and surface area of a material used as a support. In addition, it is possible with this catalyst to obtain the maximum effect with a minimum amount of catalyst due to the active sites distributed on the large surface, suggesting that this catalyst can be a breakthrough for the innovative improvement of catalytic reactions for optimal process. Considering the process efficiency, energy saving and high selectivity, the nano-structured catalyst is expected to exhibit a high value-added more than 10 times the price of the catalyst when it is applied to a reaction. Due to such advantages, the metal nano particle supported catalyst has been applied to a variety of petrochemical reactions. A small number of large factories have been producing and selling catalysts so far. However in the future, a system that can supply the catalyst independently in a local in a small scale can be required.

In general, a solid catalyst is prepared by co-precipitation in which an active metal precursor and a metal oxide precursor are co-precipitated and then heat-treated, or by incipient wetness method in which a metal precursor solution prepared by dissolving a metal salt in a properly selected solvent is loaded on a support having the structure already formed, followed by drying and reducing thermally at a high temperature. The nano catalysts which have been studied and reported in the academic world for the last 10 years (catalysts having hierarchical structures such as core-shell and yoke-shell) made an innovation in the aspects of catalyst stability and selectivity. However, there are still issues of reproducibility of the catalyst and reliability of the production method, making mass-production difficult, in addition to economical inefficiency attributed to the expensive metal salts required for the catalyst. In addition, there is an environmental issue in relation to the post-treatment of a toxic solvent used for the catalyst production. Therefore, in order to effectively produce a solid nano catalyst, it is required to develop a high-performance catalyst technology capable of high-reliability, eco-friendly mass production, high dispersion of nanoparticles, high loading and low cost.

In the meantime, in relation to the conventional supported catalyst and the method thereof, Korean Patent Application No. 10-2013-0038059 (described as 'prior art' hereinafter) describes a nickel loaded catalyst for selective ring opening and a preparation method of the same. The prior art relates to a catalyst in which nickel and at least one alkaline earth metal are supported on a porous solid support, and a preparation method thereof, which is composed of the following steps: mixing a raw material and a support; aging the mixture to obtain a precipitate; firing the precipitate in a gas atmosphere; and reducing the fired precipitate.

However, the prior art above only provides a limited preparation method of a nickel catalyst and is very difficult for a user/manufacturer to produce the catalyst if the user or manufacturer does not have full knowledge of the weight ratio, the kind of carrier, the kind of raw material and all the details of the conditions in the course of the catalyst preparation.

To overcome the problems of the prior art and to meet the technical needs, a new catalyst preparation apparatus utilizing the water-based metal salt infiltration technology and a system to control the apparatus above have been established in order to produce a reliable catalyst, precisely wherein a metal salt is evenly loaded in limited pores of a support, followed by decomposition to produce a catalyst supported by nano particles evenly.

The catalyst preparation system above is an environmentally friendly catalyst synthesis method that maximizes the catalyst performance while lowering the production cost. This catalyst preparation system can be utilized in various metal-based catalyst reactions in the future, and is appropriate for automation of the entire system in order for non-professionals to utilize this system easily.

SUMMARY OF THE INVENTION

It is an object of the present invention to provide a highly reliable catalyst preparation apparatus and system.

It is another object of the present invention to provide a catalyst preparation apparatus and system which are easy to use.

The integrated catalyst preparation apparatus according to an example of the present invention comprises a separable material injection part for injecting a metal salt and a support raw material therein; a mixing part for mixing the materials injected in the material injection part; an aging part for aging the materials mixed in the mixing part and supporting the metal salt solution in the support material evenly; and a firing part for forming nano particles in the pores of the support material by decomposing the metal salt supported in the aging part at a high temperature.

The mixing part can also include a mixing chamber for receiving the raw materials therein. The materials can be mixed evenly by shaking the mixing chamber or grinding the materials mechanically in the mixing chamber.

In addition, the aging part can include an aging chamber for receiving the raw materials therein and impregnating the metal salt solution in the pores of the support.

Further, the aging chamber can be sealed from the outside.

The aging part can additionally include a water supplying part to supply water at a required amount in order to increase the flow effect and impregnation effect of the metal salt using the capillary force when the metal salt is impregnated in the support in the aging part.

The integrated catalyst preparation apparatus according to an example of the present invention can additionally include a heating part disposed outside the aging chamber.

The integrated catalyst preparation apparatus according to an example of the present invention can additionally include a moving part disposed between the material injection part, the mixing part, the aging part and the firing part and being a passage for moving the raw material. The material can also be treated in one chamber or a reactor without flowing through the mixing part, the aging part and the firing part.

The integrated catalyst preparation apparatus according to an example of the present invention can additionally include a transfer gas supplying part connected to the moving part and supplying an inert gas to the moving part.

Further, the firing part can include a discharging part for discharging the reaction gas.

The integrated catalyst preparation apparatus according to an example of the present invention can additionally include a catalyst passivation part to passivate the surface of the nano particles formed in the firing part.

In addition, the catalyst passivation part can include a solvent injection port for injecting an organic solvent therein.

The catalyst preparation system according to an example of the present invention comprises a separable material injection part for injecting raw materials therein; a mixing part for mixing the materials injected in the material injection part; an aging part for aging the materials mixed in the mixing part at a high temperature; a firing part for forming active nano particles supported on the support by heat-treating the materials aged in the aging part; a moving part disposed between the material injection part, the mixing part, the aging part and the firing part and being a passage for moving the raw material; a transfer gas supplying part connected to the moving part and supplying an inert gas to the moving part; a screen for checking the activity input and for outputting the progress; and a control part for storing the production process data of the catalyst and controlling the material injection part, the mixing part, the aging part, the firing part, the moving part and the transfer gas supplying part through a stepwise algorithm by applying the data according to the type of the catalyst to be injected.

In addition, the catalyst preparation system according to an example of the present invention can additionally include a catalyst passivation part to passivate the raw materials supported in the firing part.

Advantageous Effect

The catalyst preparation apparatus according to an example of the present invention is advantageous in the production of various catalysts with reliability in which single metal, alloy, metal carbide or metal oxide nanoparticles are highly dispersed without expert knowledge in catalyst synthesis.

The catalyst preparation apparatus according to an example of the present invention is also advantageous in the automatic synthesis of a catalyst without expert knowledge by using the control part controlling the catalyst preparation apparatus based on the data appropriate for the materials injected therein.

Also, the catalyst preparation apparatus according to an example of the present invention has an advantage of reducing the amount of the raw materials remaining in the apparatus by moving the raw materials in the preparation apparatus by injecting an inert gas through the transfer gas supplying part.

In addition, the catalyst preparation apparatus according to an example of the present invention has an advantage of improving the stability by preventing rapid oxidation of the metal-supported catalyst by treating an organic solvent to the catalyst passivation part.

DESCRIPTION OF THE PREFERRED EMBODIMENTS

Hereinafter, the present invention is described in more detail with the attached figures. The present invention, however, is not limited by the exemplary embodiments. The same reference mark shown in each figure indicates the subject performing the same function.

The objects and effects of the present invention can be understood or clarified naturally by the following description, but not always limited thereto. In the following description, if a detailed description of the well-known technology in relation to the present invention obscures the invention, the description would be omitted.

The catalyst preparation system (1) according to an example of the present invention can load a metal salt evenly in the limited pores of a support based on an infiltration process. The catalyst preparation system (1) can produce a highly reliable catalyst by storing utilizing the catalyst preparation data according to raw materials. In particular, the catalyst preparation system (1) can easily produce a highly reliable catalyst without expert knowledge of the catalyst, and can automatically produce the catalyst even in a small space such as a home or a laboratory.

Figure 1:
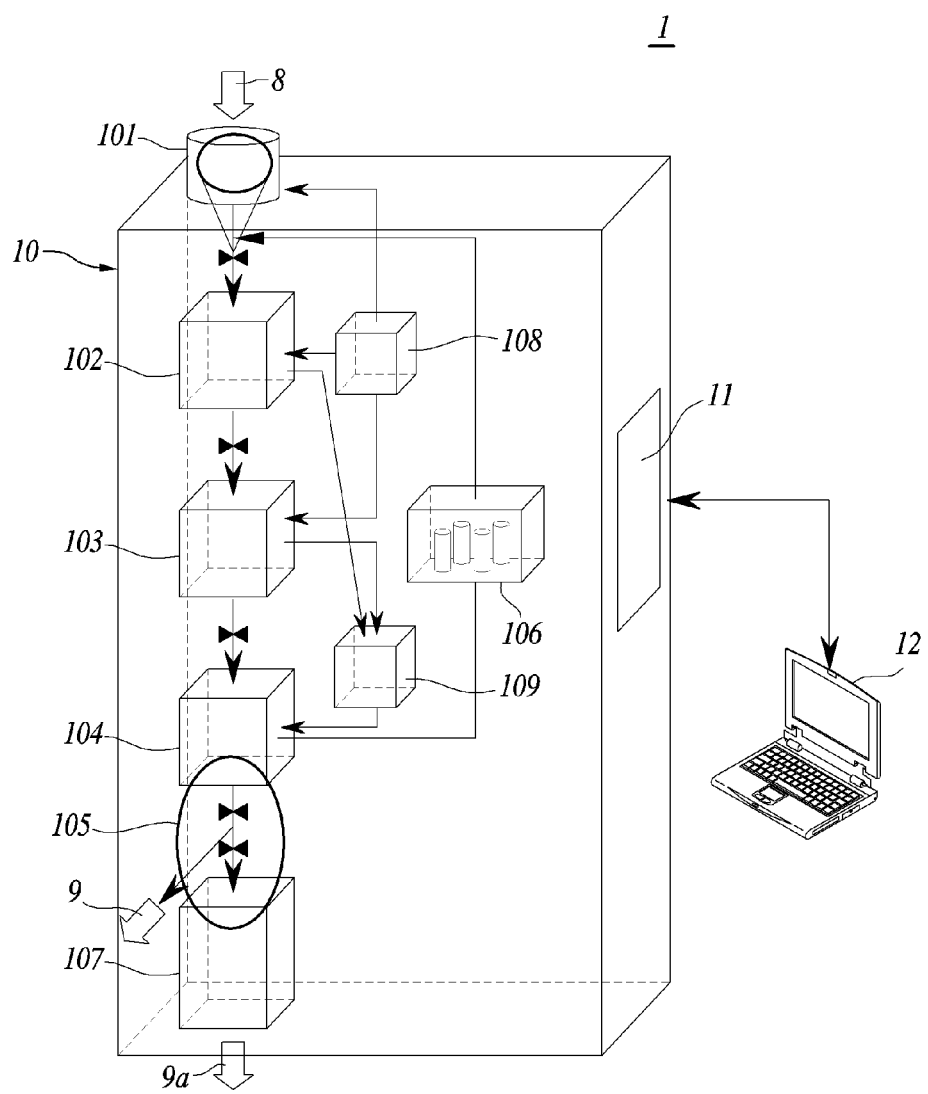
FIG. 1 shows a catalyst preparation system according to an example of the present invention.

FIG. 1 shows a catalyst preparation system (1) according to an example of the present invention.

As shown in FIG. 1, the catalyst preparation system (1) can comprise an integrated catalyst preparation apparatus (10), a screen (11) and a control part (12).

The integrated catalyst preparation apparatus (10) can produce the catalyst through a predetermined preparation process by injecting the raw materials. The integrated catalyst preparation apparatus (10) can be connected to the screen (11) and the control part (12). The integrated catalyst preparation apparatus (10) can transmit the information of the catalyst in the course of preparation to the control part (12). The integrated catalyst preparation apparatus (10) can produce a catalyst by applying the modified setting according to the injected raw material. The integrated catalyst preparation apparatus (10) can comprise a material injection part (101), a mixing part (102), an aging part (103), a firing part (104), a moving part (105), a transfer gas supplying part (106), a catalyst passivation part (107), a water control part (108) and a drying part (109). The mixing part (102), the aging part (103), the firing part (104) and the catalyst passivation part (107) can be arranged in the same location or can be the same part, and perform different functions according to the processing step.

The material injection part (101) can inject the raw material (8) into the inside and can be separated.

In an example of the present invention, the material injection part (101) can be equipped as a means for injecting the raw material (8) for producing a catalyst in the integrated catalyst preparation apparatus (10). The material injection part can be made of glass or plastic (Teflon, polypropylene, etc.) which has strong acid resistance and is easy to clean. The raw material (8) can include a metal salt and a support. The metal salt herein can include a metal hydrate and a metal salt having the melting point of at least 120° C. The metal salt can include a metal salt dissociated in water. Raw materials and reagents in liquid or solid form can be easily injected through the material injection part (101). The raw material (8) injected through the material injection part (101) can be moved downward by gravity. The moving part (105) can be connected to the bottom of the material injection part (101). The raw material (8) is transferred to the moving part (105) through the material injection part (101) and the transferred raw material (8) can be transferred to the mixing part (102) through the moving part (105). The information of the raw material (8) injected in the material injection part (101) can be delivered to the control part (12). At this time, the integrated catalyst preparation apparatus (10) can be controlled by the data stored according to the raw material (8). In addition, the material injection part (101) can be injected with gas from the transfer gas supplying part (106) to improve the movement efficiency of the injected raw material (8). The injected gas above is used as a carrier to reduce the remaining materials and to transport the raw material faster and accurately.

The raw material (8) can include a metal salt and a support. The metal salt herein can include a metal hydrate and a metal salt having the melting point of at least 120° C. The metal salt can include a metal salt dissociated in water. The metal salt can include a metal salt having a solubility of 0.3 (g salt/g water) at 25° C. Preferably, the metal salt can be contained excessively relative to the weight of the support. The metal salt herein can include the metal salts listed in Table 1 below.

TABLE 1

|    |   | molar mass (g/mol) | density (g/cm$^3$) | melting point (° C.) | solubility in water |
|---|---|---|---|---|---|
|    | Zinc acrylate | 207.5 | 1.6 | 240-244 | Soluble completely in acrylic acid and water (as a salt). |
| Li | Lithium hexafluorophosphate | 151.905 | 1.5 | 200 | soluble |
|    | Lithium bromide hydrate | 86.85 | 3.464 | 162-167 | 166.7 g/100 mL (20° C.) |
|    | Lithium acetate | 65.99 | 1.26 | 283-285 | 45.0 g/100 mL |
|    | Zinc nitrate | 189.36 | 2.065 | 110 | soluble |
|    | Zinc nitrate hexahydrate | 297.49 | 2.065 | 36.4 | 184.3 g/100 ml, 20° C. |
|    | Lithium perchlorate | 106.39 | 2.42 | 236 | 59.8 g/100 mL (25° C.) |
|    | Zinc perchlorate | 372.38 | 2.252 | 106 | soluble |
|    | Lithium tetrafluoroborate | 93.746 | 0.852 | 293-300 (dec.) (lit.) | very soluble |
|    | Zinc chloride | 232.29 | 2.15 | 60 | 200 g/100 mL (20° C.) |
|    | Lithium nitrate | 68.946 | 2.38 | 255 | 52.2 g/100 mL (20° C.) |
| Cd | Cadmium chloride | 183.31 | 4.047 g/cm3 (anhydrous) 3.327 g/cm3 (hemipentahydrate) | 568 | 119.6 g/100 mL (25° C.) (monohydrate) 90 g/100 mL (0° C.) (hemipentahydrate) |
| Na | Sodium hydroxide | 40 | 2.13 | 318 | 1110 g/L (20° C.) |
|    | Sodium lactate | 112.06 | 1.33 | 163-165 | >1.5 g/mL |
|    | Sodium acetate anhydrous | 82.03 | 1.528 | 324 | 123.3 g/100 mL (20° C.) |
|    | Sodium acetate trihydrate | 136.08 | 1.45 | 58 | 46.4 g/100 mL (20° C.) |

TABLE 1-continued

| | | molar mass (g/mol) | density (g/cm³) | melting point (° C.) | solubility in water |
|---|---|---|---|---|---|
| | Cadmium sulfate anhydrous | 208.47 | 4.691 | 1000 | 76.4 g/100 mL (25° C.) |
| | Sodium borohydride | 37.83 | 1.074 | >300° C. (dec.) (lit.) | soluble |
| | Cadmium sulfate monohydrate | 226.49 | 3.79 | 105 | 76.7 g/100 mL (25° C.) |
| | Sodium nitrite | 68.9953 | 2.168 | 271 (decomposes at 320° C.) | 84.8 g/100 mL (25° C.) |
| | Cadmium sulfate octahydrate (3CdSO4•8H2O) | 769.546 | 3.08 | 40 | very soluble |
| | Sodium metabisulfite | 190.107 | 1.48 | 170 (decomposition begins at 150° C.) | 65.3 g/100 mL (20° C.) |
| | Cadmium iodide | 366.22 | 5.604 | 387 | 847 g/L (20° C.) |
| | Sodium salicylate | 160.1 | | 200 (wiki), >300 (sigma) | 124.6 g/100 g (25° C.) |
| | Cadmium acetate | 230.500 g/mol (anhydrous) 266.529 g/mol (dihydrate) | 2.341 g/cm3 (anhydrous) 2.01 g/cm3 (dihydrate) | 255° C. (anhydrous) 130° C. (dihydrate decomposes) | soluble |
| | Sodium formate | 68.007 | 1.92 | 253 | 97.2 g/100 mL (20° C.) |
| | Sodium nitrate | 84.9947 | 2.257 | 308 | 91.2 g/100 mL (25° C.) |
| | Sodium perchlorate | 122.44 | 2.4994 | 468 (decomposes, anhydrous) | 209.6 g/100 mL (25° C., anhydrous) |
| | Cadmium nitrate anhydrous | 236.42 | 3.6 | 360 at 760 mmHg | 109.7 g/100 mL (0° C.) |
| | Cadmium nitrate tetrahydrate | | 2.45 | 59.5 at 760 mmHg | 139.8 g/100 mL (30° C.) |
| | Sodium carbonate heptahydrate | 105.99 | 1.51 | 33.5 | |
| Hg | Diphenylmercury | 354.8 | 2.318 | 121-123 | insoluble in water |
| | Sodium carbonate monohydrate | 124 | 2.25 | 100 | |
| | MERCURIC NITRATE | 324.6 | 4.3 | 79 | soluble |
| | Sodium hyponitrite | 105.99 | 2.466 | 100 | soluble |
| | sodium sulfide pentahydrate | 168.12 | 1.58 | 100 | |
| Al | Aluminum sulfate | 342.15 | 2.672 | 770 (decompose) | 36.4 g/100 mL (20° C.) |
| | sodium sulfide nonahydrate | 240.18 | 1.43 | 50 | |
| | Aluminum chloride anhydrous | 133.34 | 2.48 | 192.6 | 458 g/l (20° C.) |
| | Sodium thiosulfate | 248.18 | 1.667 | 48.3 | 70.1 g/100 mL (20° C.) |
| | Aluminum iodide | 407.695 g/mol (anhydrous) 515.786 g/mol (hexahydrate) | 3.98 g/cm3 (anhydrous) 2.63 g/cm3 (hexahydrate) | 188.28 (anhydrous) 185 (hexahydrate) (decompose) | very soluble, partial hydrolysis |
| | Sodium sulfite heptahydrate | 252.15 | 1.561 | 33.4 | soluble |

TABLE 1-continued

|  |  | molar mass (g/mol) | density (g/cm³) | melting point (° C.) | solubility in water |
|---|---|---|---|---|---|
|  | Sodium sulfate decahydrate | 322.2 | 1.464 | 32.38 | 44 g/100 mL (20° C.) |
|  | Sodium bromide dihydrate | 138.92 | 2.18 | 36 | soluble |
|  | Sodium bicarbonate | 84.0066 | 2.2 | Decomposes to sodium carbonate starting at 50° C. | 96 g/L (20° C.) |
|  | Aluminum nitrate nonahydrate | 375.134 | 1.72 | 73.9 | 67.3 g/ 100 mL |
|  | Aluminum sulfate octadecahydrate | 666.44 | 1.62 | 86.5 | 36.4 g/ 100 mL (20° C.) |
|  | Aluminum bromide anhydrous | 266.694 | 3.2 | 97.5 | very soluble |
|  | Potassium formate | 84.12 | 1.908 | 167.5 | 331 g/100 mL (25° C.) |
|  | Aluminum bromide hexahydrate | 374.785 | 2.54 | 93 | very soluble |
|  | Potassium hydroxide | 56.11 | 2.12 | 360 | 121 g/100 mL (25° C.) |
|  | Aluminum chloride hexahydrate | 241.432 | 2.398 | 100 | 458 g/l (20° C.) |
|  | Potassium nitrate | 101.1032 | 2.109 | 334 | 316 g/L (20° C.) |
|  | Triisobutylaluminium | 198.33 | 0.786 | 4~6 | react |
|  | Trimethylaluminium | 144.17 | 0.752 | 15 | react |
|  | Potassium thioacetate | 114.21 |  | 173-176 | good |
| Ga | Gallium (III) bromide | 309.435 | 3.69 | 121.5 | soluble |
|  | Gallium (III) iodide | 450.436 | 4.15 | 212 | decompose |
|  | Potassium citrate | 324.41 | 1.98 | 180° C. (wiki), 275° C. (dec.) (lit.) (Aldrich) | soluble |
|  | Gallium (III) sulfide | 235.644 | 7.33 | 1090 | dissolves in water slowly |
|  | Gallium (III) chloride | 176.07 | 2.472.053 at melting point | 77.9 (anhydrous) 44.4 (hydrate) | very soluble |
|  | Potassium bisulfate | 136.169 | 2.245 | 197 (wiki), 214 (Aldrich) | 49 g/100 mL (20° C.) |
|  | Potassium azide | 81.1184 | 2.038 | 350 (wiki), ~300° C. (decomposition (Aldrich) | 50.8 g/ 100 mL (20° C.) |
| In | Indium (III) chloride | 221.18 | 3.46 | 586 | 195 g/100 mL, exothermic |
|  | Indium (III) iodide | 495.53 | 4.69 | 210 | soluble |
| Rb | Rubidium nitrate | 147.473 | 3.11 | 310 | 65 g/ 100 ml |
|  | Indium (III) bromide | 354.53 | 4.74 | 420 | 414 g/100 mL at 20° C. |
|  | Rubidium chloride | 120.921 | 2.8 | 718 | 91 g/100 mL (20° C.) |
|  | Indium nitride | 128.83 | 6.81 | 1100 | hydrolysis |
|  | Rubidium iodide | 212.3723 | 3.11 | 646.85 | 152 g/100 mL |
|  | Indium (III) acetate | 291.95 |  | 270° C. (dec.) (lit.) | soluble |
|  | Rubidium bromide | 165.372 | 3.35 | 693 | 98 g/100 mL |
|  | Rubidium fluoride | 104.4662 | 3.557 | 795 | 130.6 g/ 100 mL (18° C.) |

TABLE 1-continued

|  |  | molar mass (g/mol) | density (g/cm³) | melting point (° C.) | solubility in water |
|---|---|---|---|---|---|
|  | Indium (III) sulfate | 517.81 | 3.44 | 600 (decompose) | 539.2 g/L at 20° C. |
| Cs | Cesium acetate | 191.949 | 2.423 | 194 | 1345.5 g/ 100 ml (88.5° C.) |
| Tl |  |  |  |  |  |
| Sn | Tin (II) chloride anhydrous | 189.6 | 3.95 | 247 | 83.9 g/ 100 ml (0° C.) Hydrolyses in hot water |
|  | Cesium hydroxide | 149.912 | 3.675 | 272 | 300 g/100 mL at 30° C. |
| Be | Beryllium nitrate | 133.021982 | 1.56 | 60.5 | 166 g/100 mL |
|  | Tin (II) chloride dihydrate | 225.63 | 2.71 | 37.7 |  |
|  | Beryllium sulfate anhydrous | 105.075 | 2.44 |  | 40.0 g/ 100 mL (20° C.) |
|  | Tin (IV) chloride pentahydrate | 350.6 | 2.04 | 56 | very soluble |
|  | Beryllium sulfate tetrahydrate | 177.136 | 1.71 | 110 | 40.0 g/ 100 mL (20° C.) |
|  | Tin (IV) iodide | 626.33 | 144 | 4.47 | decomposes in water |
| Mg | Magnesium nitrate anhydrous | 148.31 | 0.889 | 648 | soluble |
|  | Tin (II) sulfate | 214.773 | 4.15 | 378 | 33 g/100 mL (25° C. |
|  | Magnesium nitrate dihydrate | 184.35 | 2.0256 | 129 | soluble |
|  | Tin (II) fluoride | 156.69 | 4.57 | 213 | 35 g/100 mL (20° C.) |
|  | Magnesium nitrate hexahydrate | 256.41 | 1.464 | 88.9 |  |
|  | Tin (II) acetate | 236.8 | 2.31 | 180-182 | Decomposes in water |
|  | Magnesium sulfate monohydrate | 138.38 | 2.445 | 200 (decompose) | soluble |
|  | Tin (IV) bromide | 438.33 | 3.34 | 31 | soluble |
|  | Magnesium perchlorate anhydrous | 223.206 | 2.21 | 251 | 99.3 g/ 100 mL |
| Pb | Lead nitrate | 331.2 | 4.53 | 470 | 597 g/L (25° C.) |
|  | Lead (IV) acetate anhydrous | 443.376 | 2.228 | 175 | soluble |
|  | Magnesium perchlorate hexahydrous | 331.29 | 1.98 | 95-100 |  |
|  | Lead (II) acetate trihydrate | 379.33 | 2.55 | 75 | 44.31 g/ 100 mL (20° C.) (anhydrous) |
|  | Magnesium iodide anhydrous | 278.1139 | 4.43 | 637 | 148 g/100 cm3 (anhydrous, 18° C.) |
|  | Lead (II) acetate decahydrate | 505.43 | 1.69 | 22 |  |
|  | Magnesium iodide octahydrous | 422.236 | 2.098 | 41 | 81 g/100 cm3 (octahydrate, 20° C.) |

TABLE 1-continued

| | | molar mass (g/mol) | density (g/cm³) | melting point (° C.) | solubility in water |
|---|---|---|---|---|---|
| As | Sodium arsenite | 191.92 | 1.87 | 550 (decompose) | 156 g/100 mL |
| Sb | Antimony (III) acetate | 298.89 | 1.22 | 128.5 | moderately water-soluble |
| | Magnesium sulfate anhydrous | 120.366 | 2.66 | 1124 (decompose) | 35.1 g/100 mL (20° C.) |
| | Magnesium sulfate heptahydrate | 246.47 | 1.68 | 150 (decompose) | 113 g/100 mL (20° C.) |
| | Antimony (III) fluoride | 178.76 | 4.379 | 292 | 443 g/100 mL (20° C.) |
| Ca | Calcium chloride monohydrate | | 2.24 | 260 (decompose) | |
| | Antimony (III) sulfate | 531.7078 | 3.6246 | | soluble |
| | Calcium chloride dihydrate | 147.01 | 1.85 | 175 (decompose) | 134.5 g/100 ml (60° C.) |
| | Antimony (III) iodide | 502.47 | 4.921 | 170.5 | soluble, partially hydrolyses |
| | Calcium nitrate anhydrous | 164.088 | 2.504 | 561 | 1212 g/L (20° C.) |
| Bi | Bismuth (III) chloride | 315.34 | 4.75 | 227 | soluble |
| | Calcium nitrate tetrahydrate | 236.15 | 1.896 | 42.7 | 1290 g/L (20° C.) |
| | Bismuth (III) bromide | 448.69 | 5.7 | 218 | Decomposes in water. |
| | Calcium chloride tetrahydrate | 183.05 | 1.83 | 45.5 (decompose) | 90.8 g/100 mL (20° C.) |
| | Bismuth (III) acetate | 386.11 | | | soluble |
| Ce | Cerium (III) iodide | 520.83 | | 750 | soluble |
| | Cerium (III) chloride | 246.48 | 3.97 | 817 | 100 g/100 ml |
| | Calcium chloride hexahydrate | 219.08 | 1.71 | 30 (decompose) | 81.1 g/100 mL (25° C.) |
| | Ammonium cerium (IV) nitrate | 548.26 | | 107-108 | 141 g/100 mL (25° C.) |
| Sr | Strontium nitrate anhydrous | 211.63 | 2.986 | 570 | 660 g/L (20° C.) |
| | Ammonium cerium (IV) sulfate dihydrate | 632.55 | | 130 | soluble in water |
| | Strontium nitrate tetrahydrate | 283.69 | 2.2 | 100 (decompose) | 604.3 g/L (0° C.) |
| Pr | Praseodymium (III) chloride | 247.24 | 4.02 | 786 | 104.0 g/100 ml (13° C.) |
| | Strontium chloride hexahydrate | 266.62 | 1.93 | 115 (Sigma Aldrich), 61 (Wikipedia) | 206 g/100 mL (40° C.) |
| Nd | Neodymium (III) chloride | 250.598 | 4.13 | 958 | 0.967 kg/L at 13° C. |
| Sm | Samarium (III) chloride | 256.76 | 4.46 | 682 | 92.4 g/100 mL (10° C.) |
| | Strontium iodide | 341.43 | 4.55 | 507-645 | 177.0 g/100 mL (20° C.) |
| Eu | Europium (III) chloride | 258.32 | | 850 | 4.89 soluble |

TABLE 1-continued

|  |  | molar mass (g/mol) | density (g/cm$^3$) | melting point (° C.) | solubility in water |
|---|---|---|---|---|---|
|  | Strontium chlorate | 254.522 | 3.15 | 120 (decompose) | 174.9 g/ 100 mL (18° C.) |
| Gd | Gadolinium (III) chloride | 263.61 | 4.52 | 609 | soluble |
| Ba | Barium perchlorate | 336.228 | 3.2 | 505 | 66.48 g/ 100 mL (25° C.) |
| Tu | Terbium (III) chloride | 265.2834 | 4.358 | 558 | soluble |
| Sc | Scandium (III) chloride | 151.31 | 2.39 | 960 | soluble |
|  | Terbium (III) bromide | 398.637 | 4.67 | 828 | soluble |
| Dy | Dysprosium (III) chloride | 268.86 | 3.67 | 647 | soluble |
|  | Scandium (III) iodide | 425.67 |  | 920 | soluble |
| Y | Yttrium (III) chloride | 195.26 | 2.67 | 721 | 82 g/100 mL |
| Ho | Holmium (III) chloride | 271.289 | 3.7 | 720 | dissolve |
| La | Lanthanum (III) chloride | 245.26 | 3.84 | 858 | very soluble |
|  | Holmium (III) bromide | 404.64 | 4.85 | 919 | will dissolve |
|  | Lanthanum (III) bromide | 378.62 | 5.06 | 783 | Not Published Yet (very soluble in water) |
| Er | Erbium (III) chloride | 273.62 | 4.1 | 776 | soluble |
| Tm | Thulium (III) chloride | 275.292 | 3.98 | 824 | heptahydrate: very soluble |
|  | Thulium (III) bromide | 408.65 |  | 952 | soluble |
| Lu | Lutetium (III) chloride | 281.325 | 3.98 | 905 | soluble |
| Ti | Titanium (IV) iodide | 555.49 | 4.3 | 150 | hydrolysis |
|  | Titanium isopropoxide | 284.22 | 0.96 | 17 | react to form TiO2 |
|  | Titanium tetrabromide | 367.483 | 3.25 | 39 | hydrolysis |
| Zr | Zirconium (IV) chloride | 233.04 | 2.8 | 437 | hydrolysis |
| Hf | Hafnium (IV) chloride | 320.3 | 3.89 | 432 | decompose |
| V | Vanadium (III) chloride | 157.3 | 3 | >300° C. (decomposes) (wiki) | soluble |
|  | Vanadium pentafluoride | 145.934 | 2.502 | 19.5 |  |
| Nb | Niobium (V) chloride | 270.17 | 2.75 | 204.7 | decompose |
|  | Niobium (V) fluoride | 187.898 | 3.293 | 72-73 | reacts |
| Ta | Tantalum (V) ethoxide | 406.25 | 1.566 | 21 | miscible |
|  | Tantalum pentafluoride | 275.95 | 4.75 | 96.8 | decompose |
| Cr | Chromium (II) chloride | 122.9 | 2.88 | 824 | soluble |
|  | CHROMIUM (III) NITRATE NONAHYDRATE | 400.15 | 1.8 | 60 | soluble |
|  | Chromium (II) chloride hexahydrate | 266.45 | 1.76 | 83 | 585 g/L (hexahydrate) |
|  | Chromium pentafluoride | 291.71 | 2.89 | 34 |  |

The water control part (108) can supply water during the injected raw material is treated in the catalyst preparation apparatus (10). The water control part (108) can be connected to at least one of the material injection part (101), the mixing part (102) and the aging part (103). The water control part (108) can supply water to the material (8) contained in at least one of the material injection part (101), the mixing part (102) and the aging part (103) or to the material in the process. The water control part (108) can supply water at a proper ratio to the raw material (8). The ratio at this time can be any one of a mass ratio, a molar ratio, a concentration ratio, and a volume ratio. The water control part (108) can recognize the mass, mole, concentration, and volume of the raw material (8) or be input with the information thereof. The water control part (108) can recognize the type of the injected raw material (8) or be put with the information thereof. The water control part (108) can determine whether water is to be injected or not according to the type of the raw material (8). The water control part (108) can determine whether water is to be injected or not according to the type of the metal salt included in the raw material (8). The water control part (108) can supply water to the raw material when the melting point of the metal salt is 120° C. or higher. When the water control part (108) supplies water, it can supply water to the raw material (8) at the volume of up to 300% by the weight of the support, preferably at the volume of up to 200% by the weight of the support, and more preferably at the volume of up to 100% by the weight of the support. The amount of water supplied by the water control part (108) can satisfy $M<=3(X-Y)$, preferably $M<=2(X-Y)$, and more preferably $M<=(X-Y)$. Herein, M is the weight of water, X is the weight of the entire raw material, and Y is the weight of the metal salt. When the water control part (108) supplies water, it can supply water to the raw material (8) at the volume of up to 150% by the weight of the metal salt, preferably at the volume of up to 100% by the weight of the metal salt, and more preferably at the volume of up to 50% by the weight of the metal salt.

The drying part (109) can remove water supplied by the water control part (108) from the raw material (8). The drying part (109) can be connected to at least one of the material injection part (101), the mixing part (102), the aging part (103), the firing part (104), the moving part (105), the transfer gas supplying part (106) and the catalyst passivation part (107).

The drying part (109) can remove water from the raw material (8) included in at least one of the material injection part (101), the mixing part (102), the aging part (103), the firing part (104), the moving part (105), the transfer gas supplying part (106) and the catalyst passivation part (107) or from the raw material (8) in the process. The drying part (109) can remove water contained in the raw material (8) by freeze-drying. The drying part (109) can freeze the aqueous solution or other water-contained materials and reduce the pressure of the frozen materials to below the water vapor pressure to remove water by sublimating, resulting in a dried material. The drying part (109) can comprise a vacuum pump to prevent the entry of water vapor and a dehumidification trap equipped between the vacuum pump and the sample vessel to improve drying efficiency. The trap can be a cold trap that collects water vapor by freezing it. The trap can be maintained at a much lower temperature than the sample, and the trap can be cooled with a dry ice-acetone mixture or liquid air.

Figure 2:
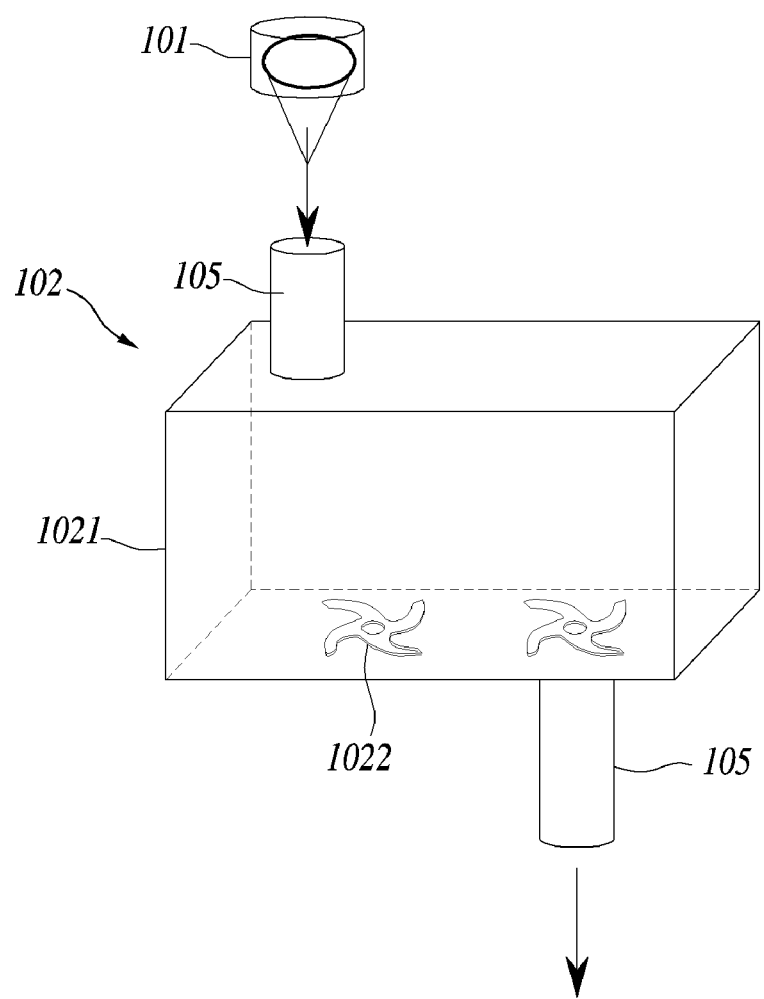
FIG. 2 shows a mixing part according to an example of the present invention.

FIG. 2 shows a mixing part (102) according to an example of the present invention. As shown in FIG. 2, the mixing part (102) can include a mixing chamber (1021) and a grinder (1022).

The raw material (8) injected in the material injection part (101) can be mixed in the mixing part (102).

In an example of the present invention, the mixing part (102) can be connected to the moving part (105). The mixing part (102) can receive the raw material (8) injected in the material injection part (101). The mixing part (102) can mix the delivered raw material. The mixing part (102) can uniformly mix the injected raw material and powder reagents. The process of mixing the raw material in the mixing part (102) can be understood as a process for improving the uniformity of mixing between the metal precursor and the support material for the catalyst production. The mixing part (102) can also be connected to the control part (12). The mixing part (102) can be controlled by the control part (12). To mix the raw material, the mixing part (102) can be shaken or rotated. The mixing part (102) can grind the raw material mechanically through the grinder (1022) installed in the inside.

The mixing chamber (1021) is functioning to mix the material.

In an example of the present invention, the mixing chamber (1021) can be understood as a chamber constituting the aging part (103). The mixing chamber (1021) can also be understood as a chamber included in the aging part (103). The mixing chamber (1021) can mix the raw material through such movements as rotation, translation, and vibration in a state of receiving the raw material. The mixing chamber (1021) can produce a supported catalyst by using different supports (bead, pellet, granule, etc.) molded in various shapes if necessary. The mixing chamber (1021) can include a grinder (1022) in the inside.

The grinder (1022) grinds the raw material mechanically, by which even mixing of the raw material can be accomplished. The grinder (1022) installed therein can be one or multiple grinders. The grinder (1022) can be installed in the bottom area, on the side or in the center of the chamber. The operation of the grinder can be determined according to the raw material to be injected.

Figure 3:
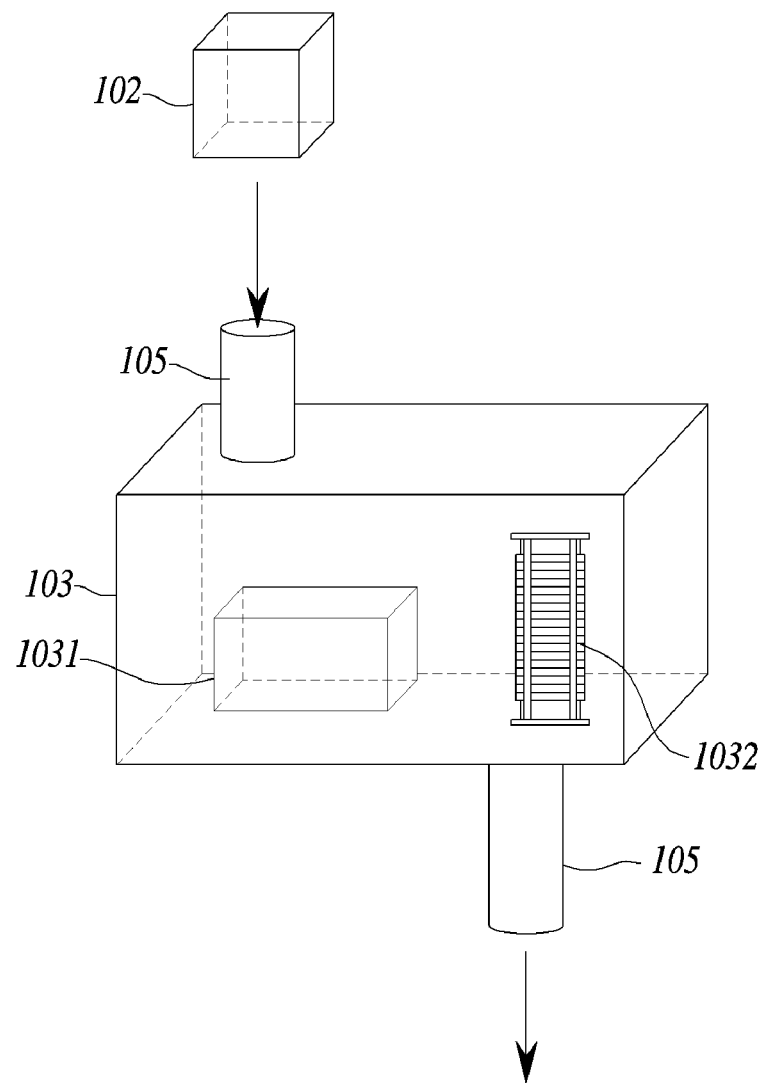
FIG. 3 shows an aging part according to an example of the present invention.

FIG. 3 shows an aging part (103) according to an example of the present invention. As shown in FIG. 3, the aging part (103) can include an aging chamber (1031) and a heating part (1032).

The aging part (103) can induce aging of the raw material mixed in the mixing part (102) at a high temperature.

In an example of the present invention, the aging part (103) can be connected to the moving part (105). The aging part (103) receives the raw material mixed in the mixing part (102). The aging part (103) can be connected to the control part (12). The aging part (103) can be controlled under the conditions set by the control part (12) according to the raw material (8) to be injected. The aging part (103) can be rotated or agitated by a stirrer to induce the metal salt to be uniformly supported in the support when the catalyst is aged. During the aging process in the aging part (103), the pressure can be increased by the vapor pressure. The aging part (103) can include an aging chamber (1031) defined as an enclosed closed system from the outside. The aging part (103) can include a heating part (1032) to heat the closed system from the outside. The temperature for aging the catalyst in the aging part (103) can be from 30° C. to 120° C. and the aging time is preferably 30 minutes to 24 hours.

The aging chamber (1031) can contain the raw material and mix the raw material.

In an example of the present invention, the aging chamber (1031) can be understood as a constituent included in the aging part (103). The aging chamber (1031) can form an enclosed closed system from the outside. The aging process in the aging chamber (1031) can be performed at a relatively low temperature which can be around 100° C. To maintain the temperature of the aging chamber (1031), a heating part (1032) can be installed on the outside of the aging chamber (1031) to heat the aging chamber (1031). The aging chamber (1031) can be rotated or agitated by a stirrer to induce the metal salt to be uniformly supported in the support when the catalyst is aged. The aging chamber (1031) can be composed of a single chamber or a plurality of chambers as necessary. The stirrer equipped in the aging chamber (1031) can be in various forms and can be modified if necessary.

The aging chamber (1031) can be sealed from the outside.

In an example of the present invention, the aging chamber (1031) forms a closed system to cut off the outside in order to prevent the increased pressure from being released out during the aging of the catalyst. The overall pressure inside the chamber can be increased by the vapor pressure raised during the aging process. At this time, the aging chamber (1031) forms a closed system to cut off from the outside in order to prevent the vapor pressure from discharging from the aging chamber (1031).

The heating part (1032) can be installed outside of the aging chamber (1031).

In an example of the present invention, the heating part (1032) can heat the aging chamber (1031) as installed outside of the aging chamber (1031). The heating part (1032) can be equipped in order to maintain the aging temperature of the aging chamber (1031). The heating part (1032) can be provided in the form of a heating jacket which covers the aging chamber (1031). The heating part (1032) can be provided in various forms in addition to the heating jacket form above in order to maintain the aging temperature of the aging chamber (1031).

Figure 4:
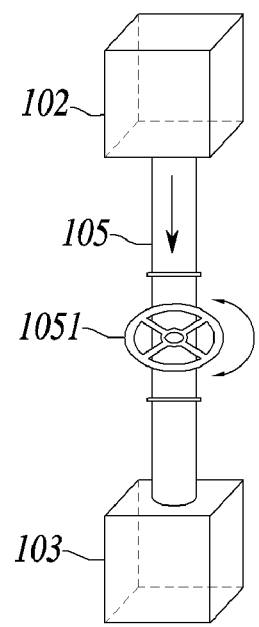
FIG. 4 shows a moving part according to an example of the present invention.

FIG. 4 shows a moving part (105) according to an example of the present invention. As shown in FIG. 4, the moving part (105) can include a valve (1051).

The moving part (105) can be disposed between the material injection part (101), the mixing part (102), the aging part (103) and the firing part (104) to be functioning as a passage through which the raw material can be transported.

In an example of the present invention, the moving part (105) can be understood as a constituent that connects each component provided for the injection, mixing, aging, firing and passivation of the raw material and the injection of the inert gas. The raw material, reagent and inert gas can be transported through the moving part (105) by gravity. The moving part (105) can be required to have a component for controlling the flow of the raw material, reagent and inert gas. Therefore, the moving part (105) can include a valve (1051).

The valve (1051) can be understood as a means installed in the moving part (105) for controlling the flow of the fluid moving through the moving part (105). The valve (1051) can be installed in the single moving part (105) in a single or plural numbers. The valve (1051) can be driven manually or automatically. When the valve (1051) is driven automatically, the valve (1051) can be connected to the control part (12) to close and open the valve. The valve (1051) shown in FIG. 4 is an example of the usable valves. Various types of valves (1051) can be provided according to design and need.

In particular, a plurality of valves (1051) can be installed in the moving part (105) connecting the firing part (104) and the catalyst passivation part (107). The valves (1051) installed in the moving part (105) can be selectively opened and closed. When the raw material (8) injected in the material injection part (101) is rapidly oxidized such as metals or carbonized metals, all the valves (1051) can be opened to transport the raw material from the aging part (103) to the catalyst passivation part (107).

The stability of the catalyst can be improved by passivating the catalyst (9a) produced through the above process in the catalyst passivation part (107). On the other hand, when the raw material is not rapidly oxidized, the catalyst (9) can be produced without opening the valve. The process described above can be controlled according to production process data processed by the control part (12) during the process of injecting the raw material (8) and is provided for easily generating a catalyst without expert knowledge related to the catalyst production.

Figure 5:
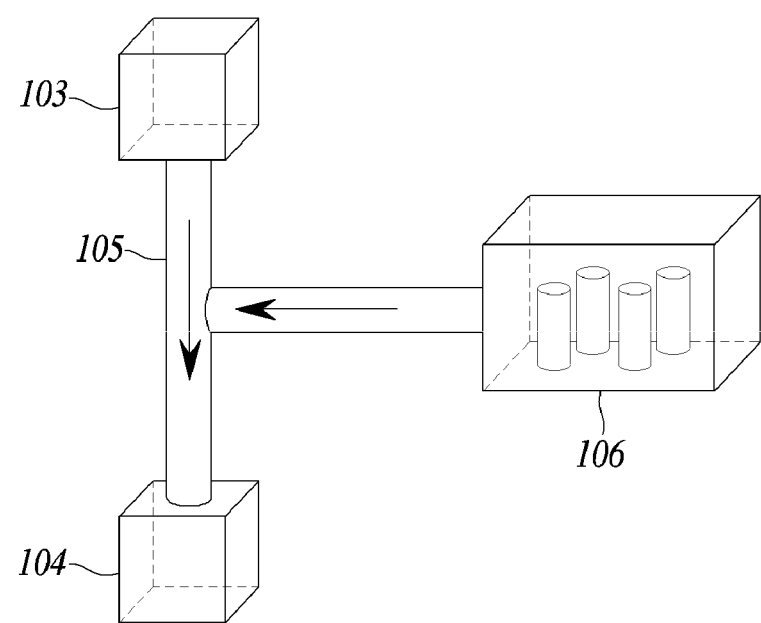
FIG. 5 shows a transfer gas supplying part according to an example of the present invention.

FIG. 5 shows a transfer gas supplying part (106) according to an example of the present invention. The transfer gas supplying part (106) is connected to the moving part (105), through which an inert gas can be provided to the moving part (105).

In an example of the present invention, the transfer gas supplying part (106) can be connected to the moving part (105). The transfer gas supplying part (106) can supply gas. The gas provided through the transfer gas supplying part (106) can be selected from the group consisting of such an inactive gas as nitrogen or argon, air, carbon monoxide, hydrogen and a mixture thereof. The transfer gas supplying part (106) can be connected to the control part (12). The supply of the inactive gas by the transfer gas supplying part (106) can be determined according to the raw material (8) to be injected. The inert gas supplied from the transfer gas supplying part (106) can make the flow of the raw material (8) smooth and therefore can reduce the amount of the material remaining after the process. The inert gas supplied from the transfer gas supplying part (106) can increase the speed of transportation of the raw material through the passivation process of the fast oxidized materials such as metals or carbonized metals, so that the oxidization of the raw material in the course of transportation can be minimized.

Figure 6:
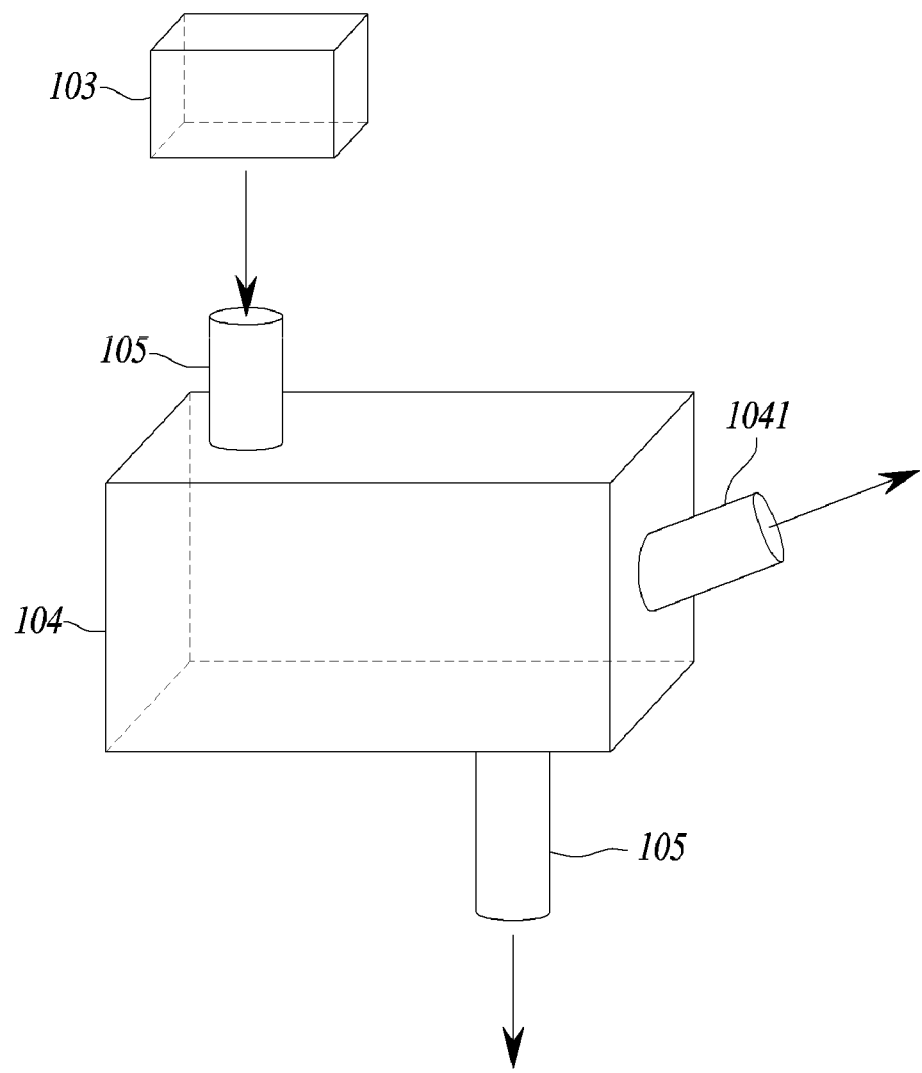
FIG. 6 shows a firing part according to an example of the present invention.

FIG. 6 shows a firing part (104) according to an example of the present invention. As shown in FIG. 6, the firing part (104) can include a discharging part (1041).

The firing part (104) can decompose the metal salt impregnated in the pores of the support in the aging part (103) to support the nanoparticles in the support evenly.

In an example of the present invention, the firing part (104) can be connected to the moving part (105). The firing part (104) can receive the raw material aged in the aging part (103).

The firing part (104) can be connected to the control part (12). The firing part (104) can be controlled according to the setting of the control part (12). The firing part (104) can be designed to allow heat treatment at the temperature between 200° C. and 900° C. The heat treatment in the firing part (104) can be performed in an atmosphere supplied with various gases (hydrogen, nitrogen, carbon monoxide, mixed gas, etc.). In particular, the firing part (104) can generate various catalytic materials such as metals, metal oxides, and metal carbides after receiving a proper gas from the transfer gas supplying part (106) at normal pressure. The firing part (104) can produce a catalyst wherein metal oxide, metal carbide, metal nitride or metal nanoparticles are supported in a porous support.

The discharging part (1041) can discharge reaction gas.

In an example of the present invention, the discharging part (1041) can be understood as a discharge port installed in the firing part (104). The discharging part (1041) can be provided for discharging the residual gas reacted in the firing part (104). In particular, the discharging part (1041) can be provided to discharge the decomposed gas generated after the heat treatment.

Figure 7:
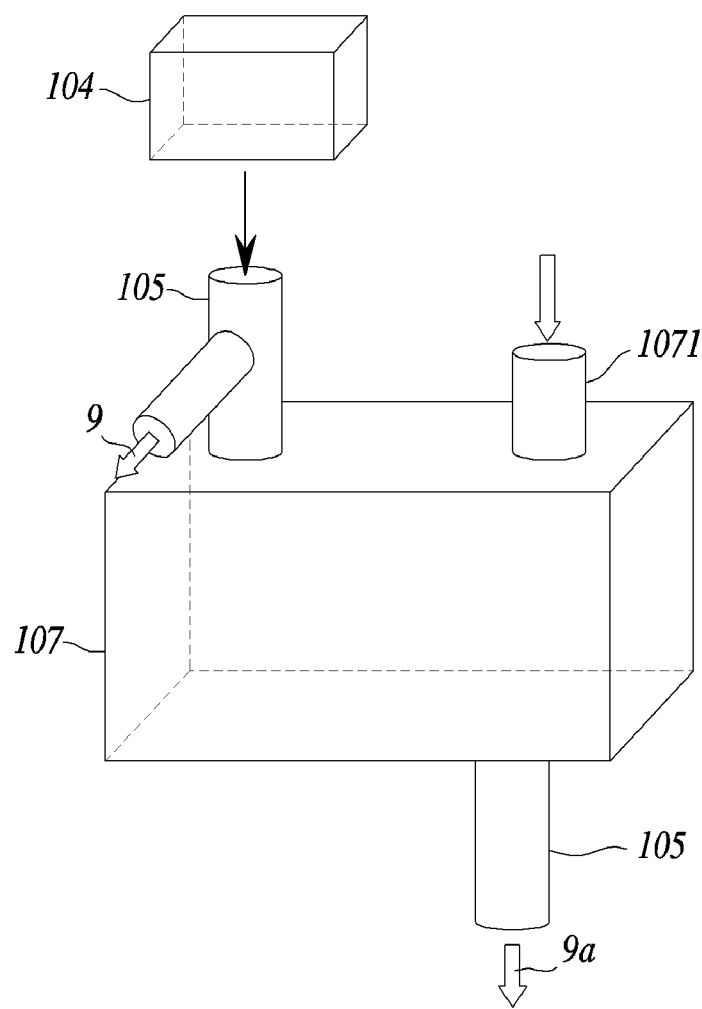
FIG. 7 shows a catalyst passivation part according to an example of the present invention.

FIG. 7 shows a catalyst passivation part (107) according to an example of the present invention. As shown in FIG. 7, the catalyst passivation part (107) can include a solvent injection port (1071). The catalyst passivation part (107) can passivate the raw material supported in the firing part (104).

In an example of the present invention, the catalyst passivation part (107) can be connected to the moving part (105). The catalyst passivation part (107) can receive the aged raw material or the catalyst from the moving part (105). The catalyst passivation part (107) can receive gas provided from the transfer gas supplying part (106) through the moving part (105). The raw material can be transported to the catalyst passivation part (107) by gravity. The transfer velocity can be increased by the flow of the injected gas. Since the raw material supplied to the catalyst passivation part (107) is expected to be oxidized during the transportation, a fast moving speed is required, so that the supply of gas from the transfer gas supplying part (106) can be additionally performed. The catalyst passivation part (107) can be connected to the control part (12). The catalyst passivation part (107) can be controlled according to the setting of the control part (12). The catalyst passivation part (107) can passivate the transferred raw material. The passivation can be performed in the catalyst passivation part (107) by using a solvent in order to prevent the rapid oxidation of the raw material. The catalyst passivation part (107) can produce a stable catalyst after the passivation process.

Passivation is a method of shielding harmful environments to prevent oxidation of metals or materials, and is a method of suppressing oxidation to improve stability by coating the surface of the material. The passivation method includes a chemical method and an electrochemical method.

An organic solvent can be injected into the inside through the solvent injection port (1071).

In an example of the present invention, the solvent injection port (1071) can be understood as a component provided for injecting a solvent for the passivation in the catalyst passivation part (107). The solvent injection port (1071) can be provided as a different pathway from the moving part (105). A user can inject a solvent directly through the solvent injection port (1071) or a solvent can be automatically injected through the solvent injection port by the setting of the control part (12). When the solvent is automatically injected, a user can easily produce a catalyst without expert knowledge on the catalyst production process. The solvent injected in the solvent injection port (1071) can be an organic solvent, and the organic solvent can be exemplified by ethanol and dimethyl carbonate.

As shown in FIG. 1, the screen (11) can check the job entry process and can output the process progress.

In an example of the present invention, the screen (11) is installed on the outside of the integrated catalyst preparation apparatus (10) so that a user can easily check on it. Single or multiple screens (11) can be installed for the convenience of a user. The screen (11) can be connected to the control part (12). The screen (11) can check the job entry process of the integrated catalyst preparation apparatus (10) through the control part (12). The screen (11) can output the process progress of the integrated catalyst preparation apparatus (10). The screen (11) can include a touch panel.

The control part (12) stores the production process data of the catalyst and can control The control part (12) is to store catalyst production process data and to control the material injection part (101), the mixing part (102), the aging part (103), the moving part (105), the transfer gas supplying part (106) and the catalyst passivation part (107) by applying the data according to the type of the injected raw material (8). The control part (12) can control the feed rate of the raw material and the amount of water supplied according to the recipe inputted at the time of producing the catalyst, so that the catalyst can be easily prepared. In addition, the control part (12) can control the catalyst preparation conditions such as temperature and time.

In an example of the present invention, the control part (12) can be understood as a component for providing convenience of a user.

In particular, when the catalyst preparation apparatus is used in a small space such as a home, a research institute, and a small factory, the control part (12) can store the catalyst production process data so that a user who does not have expert knowledge in this field can produce a catalyst easily. The catalyst production process can be automatically controlled according to the injected raw material. In addition, the control part (12) can edit the stored catalyst production process data by modification or supplementation. This makes it possible to produce a reliable catalyst reproducibly when the catalyst preparation system (1) is used regardless of the degree of experience or knowledge of a user. In addition, the newly developed catalyst preparation process can be continuously updated through a certain program and IoT (Internet of Things) can be applied to the catalyst preparation.

The control part (12) can be provided in various forms such as a computer, a mobile device, a laptop, and the like capable of storing, editing, and communicating data.

The present invention has been illustrated hereinbefore with exemplary examples, but it is well understood by those in the art that various modifications of the examples of the invention can be made and such modifications can be included in this invention as well unless the modifications exceed the scope of the present invention. Therefore, the scope of the present invention should not be limited to the examples described above, but should be determined by all the changes or modifications derived from the appended claims and equivalents thereof.

INDUSTRIAL APPLICABILITY

A catalyst is a material playing a key role in a variety of industries, including petrochemicals, plastics, and pharmaceuticals, etc. Nowadays, a catalyst is widely used not only in the huge process industry but also in everyday life related matters including deodorization and sterilization for home and industry and automobile exhaust gas decomposition.

What is claimed is:

1. An integrated catalyst preparation apparatus comprising:
    a material injection part for injecting raw materials therein;
    a water control part for supplying water to the raw materials above;
    a mixing part for mixing the injected raw materials;

an aging part for aging the mixed raw materials; and a firing part for supporting the aged raw materials in a support.

2. The integrated catalyst preparation apparatus according to claim 1, wherein the raw material includes a metal salt and a support.

3. The integrated catalyst preparation apparatus according to claim 2, wherein the aging part is to support the metal salt above in the support.

4. The integrated catalyst preparation apparatus according to claim 1, wherein the aging part includes an aging chamber for storing the raw materials in the inside and mixing the raw materials therein.

5. The integrated catalyst preparation apparatus according to claim 4, wherein the aging chamber is sealed from the outside.

6. The integrated catalyst preparation apparatus according to claim 5, wherein a heating part is additionally included on the outside of the aging chamber.

7. The integrated catalyst preparation apparatus according to claim 1, wherein a moving part is additionally included between the material injection part, the mixing part, the aging part and the firing part and being a passage for moving the raw material.

8. The integrated catalyst preparation apparatus according to claim 7, wherein a transfer gas supplying part connected to the moving part and supplying an inert gas to the moving part is additionally included.

9. The integrated catalyst preparation apparatus according to claim 1, wherein the firing part includes a discharging part for discharging the reaction gas.

10. The integrated catalyst preparation apparatus according to claim 1, wherein a catalyst passivation part for passivating the raw material supported in the firing part is additionally included.

11. The integrated catalyst preparation apparatus according to claim 2, wherein the water control part is to recognize the kind of the metal salt and to determine the water supply thereby.

12. The integrated catalyst preparation apparatus according to claim 11, wherein the water control part sprays water at the volume of up to 300% by the weight of the support, when water is supplied.

13. The integrated catalyst preparation apparatus according to claim 1, wherein a drying part for removing moisture from the aged material is additionally included.

14. The integrated catalyst preparation apparatus according to claim 13, wherein the drying part removes moisture by freeze-drying.

\* \* \* \* \*